US008792197B1

(12) United States Patent
Wilson et al.

(10) Patent No.: US 8,792,197 B1
(45) Date of Patent: Jul. 29, 2014

(54) STORAGE DEVICE WITH DRIVER CONTROLLER PROVIDING PATTERN-DEPENDENT WRITE FUNCTIONALITY

(71) Applicant: LSI Corporation, San Jose, CA (US)

(72) Inventors: Ross S. Wilson, Menlo Park, CA (US); Jason P. Brenden, Woodbury, MN (US); Paul Mazur, Cottage Grove, MN (US); Cameron C. Rabe, Inver Grove Heights, MN (US); Gang Chen, Ontario (CA)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/074,325

(22) Filed: Nov. 7, 2013

Related U.S. Application Data

(60) Provisional application No. 61/880,309, filed on Sep. 20, 2013.

(51) Int. Cl.
*G11B 5/09* (2006.01)
*G11B 5/02* (2006.01)

(52) U.S. Cl.
USPC .............................................. 360/46; 360/68

(58) Field of Classification Search
None
See application file for complete search history.

(56) References Cited

U.S. PATENT DOCUMENTS

| 6,826,003 | B1 | 11/2004 | Subrahmanyam |
| 7,035,028 | B2 | 4/2006 | Venca et al. |
| 7,154,687 | B2 | 12/2006 | Ikekame et al. |
| 7,365,928 | B2 | 4/2008 | Venca et al. |
| 7,830,631 | B2 | 11/2010 | Nakagawa et al. |
| 7,924,518 | B2 | 4/2011 | Mathew et al. |
| 2007/0146922 | A1 | 6/2007 | Okada |
| 2013/0128375 | A1 | 5/2013 | Livshitz et al. |

*Primary Examiner* — Regina N Holder
(74) *Attorney, Agent, or Firm* — Ryan, Mason & Lewis, LLP

(57) ABSTRACT

A hard disk drive or other storage device comprises a storage medium, a write head, and control circuitry coupled to the write head. The control circuitry comprises a write driver configured to generate a write signal comprising write pulses responsive to write data, and a driver controller configured to adjust overshoot amplitudes of respective ones of the write pulses utilizing a segmented digital-to-analog converter. The overshoot amplitudes are adjusted by detecting patterns in the write data, decoding a first portion of a base overshoot value to identify a corresponding number of base overshoot segments, combining the base overshoot value and a differential overshoot value, decoding a first portion of the combined base overshoot and differential overshoot values to identify a corresponding number of enhanced overshoot segments, and selecting between the number of base overshoot segments and the number of enhanced overshoot segments responsive to detection of a particular pattern.

20 Claims, 12 Drawing Sheets

FIG. 11

```
Force WD = 1T     % Find timer 1T width
for ΔT_DAC = 0:1:max
    if ΔT_DAC == 0 && TimerHit == 1 then error('Cannot resolve 1T at minimum');
    if ΔT_DAC == max && TimerHit == 0 then error('Cannot resolve 1T at maximum');
    if TimerHit == 1 then
        1T_Val = ΔT_DAC;
        break;
    end
end
Force WD = 2T     % Find timer 2T width
for ΔT_DAC = 0:1:max
    if ΔT_DAC == 0 && TimerHit == 1 then error('Cannot resolve 2T at minimum');
    if ΔT_DAC == max && TimerHit == 0 then error('Cannot resolve 2T at maximum');
    if TimerHit == 1 then
        2T_Val = ΔT_DAC;
        break;
    end
end
ΔT_DAC_Final = round$\left(\frac{2T\_Val + 1T\_Val}{2}\right)$; % use this value to center between 1T and 2T (3T/2)
```

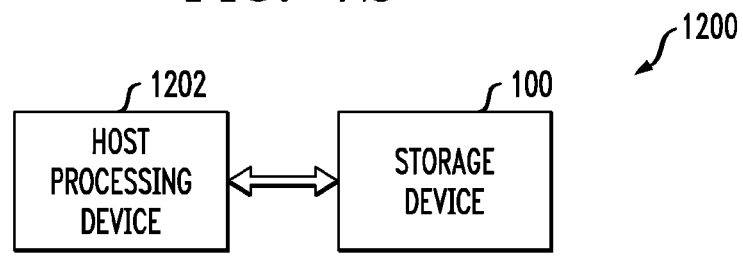
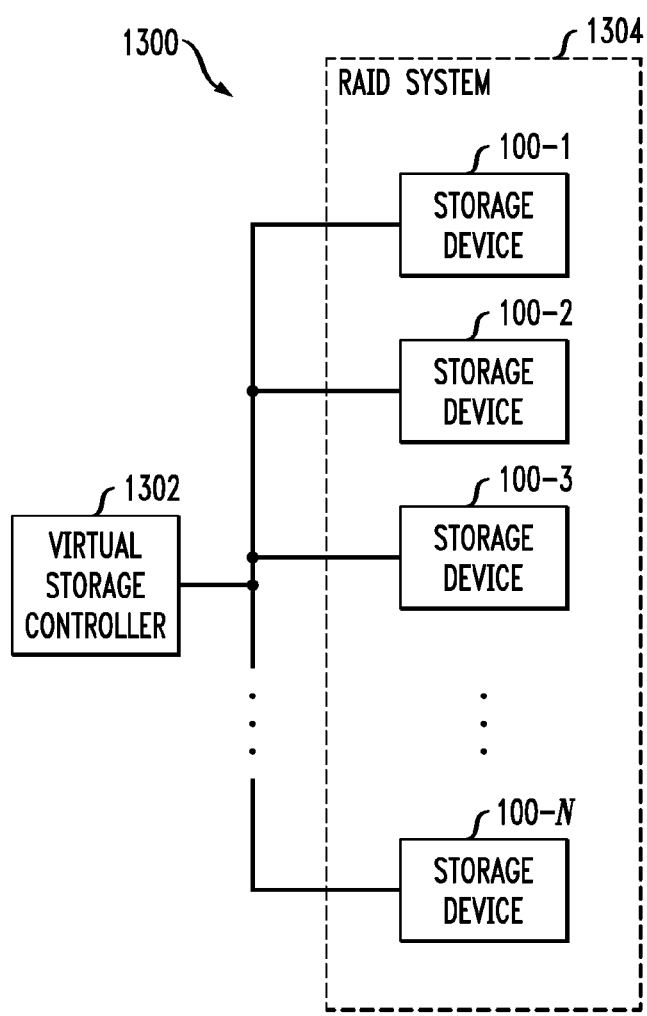

US 8,792,197 B1

STORAGE DEVICE WITH DRIVER CONTROLLER PROVIDING PATTERN-DEPENDENT WRITE FUNCTIONALITY

PRIORITY CLAIM

The present application claims the priority of U.S. Provisional Patent Application Ser. No. 61/880,309, filed Sep. 20, 2013, the disclosure of which is incorporated by reference herein in its entirety.

FIELD OF INVENTION

The field relates generally to storage devices, and more particularly to generation of write signals in storage devices.

BACKGROUND

Disk-based storage devices such as hard disk drives (HDDs) are commonly used to provide non-volatile data storage in a wide variety of different types of data processing systems. In a typical HDD, data is recorded on tracks of a magnetic storage disk using a write signal comprising multiple write pulses. The write signal is generated by a write driver that is coupled to a write head of the HDD via a transmission line. In order to record a given data bit, the write driver generates a write pulse that transitions from a negative write current to a positive write current, or vice-versa.

However, writing data to the storage disk can be challenging when utilizing conventional write pulses, particularly at high data rates on the order of 1 Gigabit per second (Gb/s) or more. In such applications, rapid reversal of the magnetic state of the write head and excellent transition quality become increasingly important. These issues have been addressed using pattern-dependent write techniques that adjust write pulse shape based on patterns detected in the write data. See, for example, U.S. Patent Application Publication No. 2013/0128375, entitled "Magnetic Recording System with Multi-Level Write Current," which is commonly assigned herewith and incorporated by reference herein. Despite the considerable advantages provided by the techniques disclosed therein, a need remains for additional improvements in implementation of pattern-dependent write functionality in a storage device.

SUMMARY

In one embodiment, an HDD or other storage device comprises a storage medium, a write head, and control circuitry coupled to the write head. The control circuitry comprises a write driver configured to generate a write signal comprising a plurality of write pulses responsive to write data, and a driver controller associated with the write driver and configured to adjust overshoot amplitudes of respective ones of the write pulses utilizing a segmented digital-to-analog converter.

The driver controller comprises a pattern detector configured to detect patterns in the write data, and pattern-dependent write circuitry comprising the segmented digital-to-analog converter.

The segmented digital-to-analog converter comprises a first segment decoder configured to decode a first portion of a base overshoot value to identify a corresponding number of base overshoot segments, a combiner configured to form a sum or other combination of the base overshoot value and a differential overshoot value, a second segment decoder configured to decode a first portion of the combination of the base overshoot value and the differential overshoot value to identify a corresponding number of enhanced overshoot segments, and switching circuitry coupled to the first and second segment decoders and configured to select between the number of base overshoot segments and the number of enhanced overshoot segments responsive to detection of a particular pattern. The overshoot amplitude for a given one of the write pulses is determined at least in part as a function of the selected one of the number of base overshoot segments and the number of enhanced overshoot segments.

The driver controller in some embodiments is further configured to adjust steady state amplitudes of respective ones of the write pulses utilizing an additional segmented digital-to-analog converter. The additional segmented digital-to-analog converter comprises a segment decoder configured to decode a first portion of a steady state value to identify a corresponding number of steady state segments, with a steady state amplitude for the given one of the write pulses being determined at least in part as a function of the number of steady state segments. A subset of the steady state segments may comprise shared segments that also serve as corresponding ones of the overshoot segments Other embodiments of the invention include but are not limited to methods, apparatus, systems, processing devices, integrated circuits and computer-readable storage media having computer program code embodied therein.

BRIEF DESCRIPTION OF THE FIGURES

FIG. 11 shows exemplary pseudocode used to implement a timer calibration algorithm for the pattern detector of FIG. 9.

FIG. 12 illustrates interconnection of the storage device of FIG. 1 with a host processing device in a data processing system.

FIG. 13 shows a virtual storage system incorporating a plurality of disk-based storage devices of the type shown in FIG. 1.

WRITTEN DESCRIPTION

Embodiments of the invention will be illustrated herein in conjunction with exemplary storage devices and control circuitry comprising write drivers and associated driver controllers. It should be understood, however, that these and other embodiments of the invention are more generally applicable to any storage device in which pattern-dependent write functionality is desired. Additional embodiments may be implemented using components other than those specifically shown and described in conjunction with the illustrative embodiments.

Figure 1:
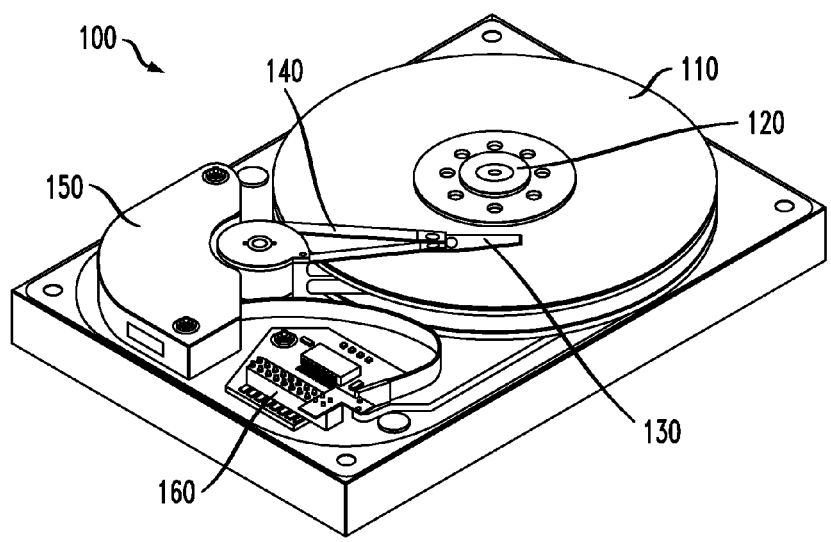
FIG. 1 shows a perspective view of a disk-based storage device in accordance with an illustrative embodiment of the invention.

FIG. 1 shows a disk-based storage device 100 in accordance with an illustrative embodiment of the invention. The storage device 100 in this embodiment more specifically comprises an HDD that includes a storage disk 110. The storage disk 110 has a storage surface coated with one or more magnetic materials that are capable of storing data bits in the form of respective groups of media grains oriented in a common magnetization direction (e.g., up or down). The storage disk 110 is connected to a spindle 120. The spindle 120 is driven by a spindle motor, not explicitly shown in the figure, in order to spin the storage disk 110 at high speed.

Data is read from and written to the storage disk 110 via a read/write head 130 that is mounted on a positioning arm 140. It is to be appreciated that the head 130 is shown only generally in FIG. 1. The position of the read/write head 130 over the magnetic surface of the storage disk 110 is controlled by an electromagnetic actuator 150. The electromagnetic actuator 150 and its associated driver circuitry in the present embodiment may be viewed as comprising a portion of what is more generally referred to herein as "control circuitry" of the storage device 100. Such control circuitry in this embodiment is assumed to further include additional electronics components arranged on an opposite side of the assembly and therefore not visible in the perspective view of FIG. 1. Examples of such additional components will be shown in other figures, such as FIGS. 3, 4 and 6-9.

The term "control circuitry" as used herein is therefore intended to be broadly construed so as to encompass, by way of example and without limitation, drive electronics, signal processing electronics, and associated processing and memory circuitry, and may encompass additional or alternative elements utilized to control positioning of a read/write head relative to a storage surface of a storage disk in a storage device. A connector 160 is used to connect the storage device 100 to a host computer or other related processing device.

It is to be appreciated that, although FIG. 1 shows an embodiment of the invention with only one instance of each of the single storage disk 110, read/write head 130, and positioning arm 140, this is by way of illustrative example only, and alternative embodiments of the invention may comprise multiple instances of one or more of these or other drive components. For example, one such alternative embodiment may comprise multiple storage disks attached to the same spindle so all such disks rotate at the same speed, and multiple read/write heads and associated positioning arms coupled to one or more actuators. Also, both sides of storage disk 110 and any other storage disks in a particular embodiment may be used to store data and accordingly may be subject to read and write operations, through appropriate configuration of one or more read/write heads.

A given read/write head as that term is broadly used herein may be implemented in the form of a combination of separate read and write heads. More particularly, the term "read/write" as used herein is intended to be construed broadly as read and/or write, such that a read/write head may comprise a read head only, a write head only, a single head used for both reading and writing, or a combination of separate read and write heads. A given read/write head such as read/write head 130 may therefore include both a read head and a write head. Such heads may comprise, for example, write heads with wrap-around or side-shielded main poles, or any other types of heads suitable for recording and/or reading data on a storage disk. Read/write head 130 when performing write operations may be referred to herein as simply a write head, also denoted by reference numeral 130W.

Also, the storage device 100 as illustrated in FIG. 1 may include other elements in addition to or in place of those specifically shown, including one or more elements of a type commonly found in a conventional implementation of such a storage device. These and other conventional elements, being well understood by those skilled in the art, are not described in detail herein. It should also be understood that the particular arrangement of elements shown in FIG. 1 is presented by way of illustrative example only. Those skilled in the art will recognize that a wide variety of other storage device configurations may be used in implementing embodiments of the invention.

Figure 2:
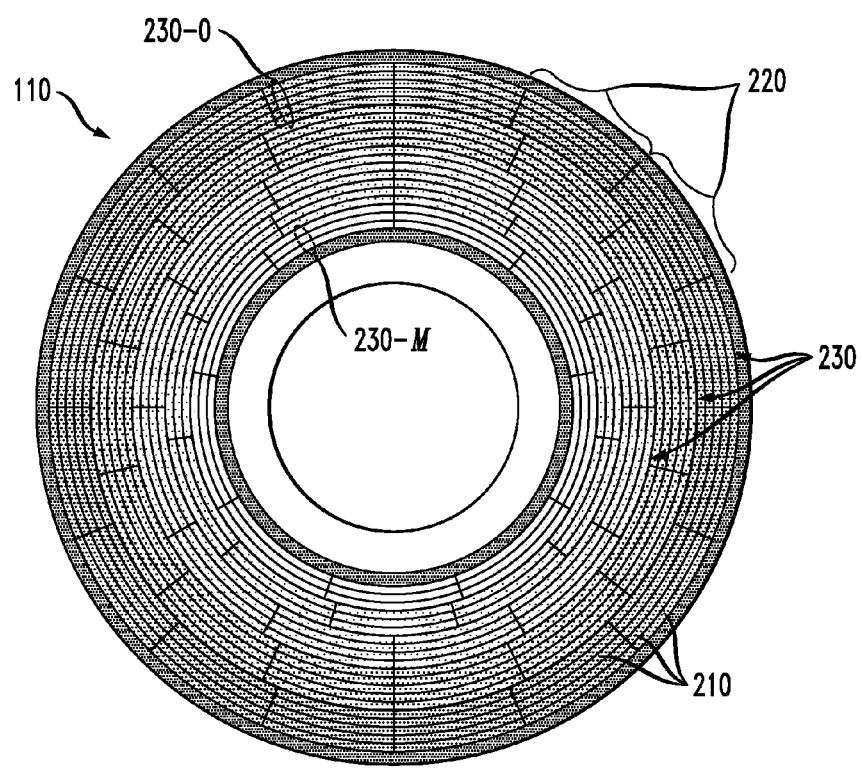
FIG. 2 shows a plan view of a storage disk in the storage device of FIG. 1.

FIG. 2 shows the storage surface of the storage disk 110 in greater detail. As illustrated, the storage surface of storage disk 110 comprises a plurality of concentric tracks 210. Each track is subdivided into a plurality of sectors 220 which are capable of storing a block of data for subsequent retrieval. The tracks located toward the outside edge of the storage disk have a larger circumference when compared to those located toward the center of the storage disk. The tracks are grouped into several annular zones 230, where the tracks within a given one of the zones have the same number of sectors. Those tracks in the outer zones have more sectors than those located in the inner zones. In this example, it is assumed that the storage disk 110 comprises M+1 zones, including an outermost zone 230-0 and an innermost zone 230-M.

The outer zones of the storage disk 110 provide a higher data transfer rate than the inner zones. This is in part due to the fact that the storage disk in the present embodiment, once accelerated to rotate at operational speed, spins at a constant angular or radial speed regardless of the positioning of the read/write head, but the tracks of the inner zones have smaller circumference than those of the outer zones. Thus, when the read/write head is positioned over one of the tracks of an outer zone, it covers a greater linear distance along the disk surface for a given 360° turn of the storage disk than when it is positioned over one of the tracks of an inner zone. Such an arrangement is referred to as having constant angular velocity (CAV), since each 360° turn of the storage disk takes the same amount of time, although it should be understood that CAV operation is not a requirement of embodiments of the invention.

Areal and linear bit densities are generally constant across the entire storage surface of the storage disk 110, which results in higher data transfer rates at the outer zones. Accordingly, the outermost annular zone 230-0 of the storage disk has a higher average data transfer rate than the innermost annular zone 230-M of the storage disk. The average data transfer rates may differ between the innermost and outermost annular zones in a given embodiment by more than a factor of two. As one example embodiment, provided by way of illustration only, the outermost annular zone may have a data transfer rate of approximately 2.3 Gb/s, while the innermost annular zone has a data transfer rate of approximately 1.0 Gb/s. In such an implementation, the HDD may more particularly have a total storage capacity of 500 Gigabytes (GB) and a spindle speed of 7200 revolutions per minute (RPM), with the data transfer rates ranging, as noted above, from about 2.3 Gb/s for the outermost zone to about 1.0 Gb/s for the innermost zone.

The storage disk 110 may be assumed to include a timing pattern formed on its storage surface. Such a timing pattern may comprise one or more sets of servo address marks (SAMs) or other types of servo marks formed in particular sectors in a conventional manner.

The particular data transfer rates and other features referred to in the embodiment described above are presented for purposes of illustration only, and should not be construed as limiting in any way. A wide variety of other data transfer rates and storage disk configurations may be used in other embodiments.

Embodiments of the invention will be described below in conjunction with FIGS. 3 to 11, in which the storage device 100 of FIG. 1 is configured to implement at least one write driver and an associated driver controller comprising a pattern detector and pattern-dependent write circuitry. The pattern-dependent write circuitry is illustratively implemented at least in part utilizing at least a portion of a segmented digital-to-analog converter. By way of example, the storage device 100 may be configured to operate in different modes of operation, including modes with and without pattern-dependent write. Examples of write pulse waveforms will be described in greater detail below in conjunction with FIG. 5.

Figure 3:
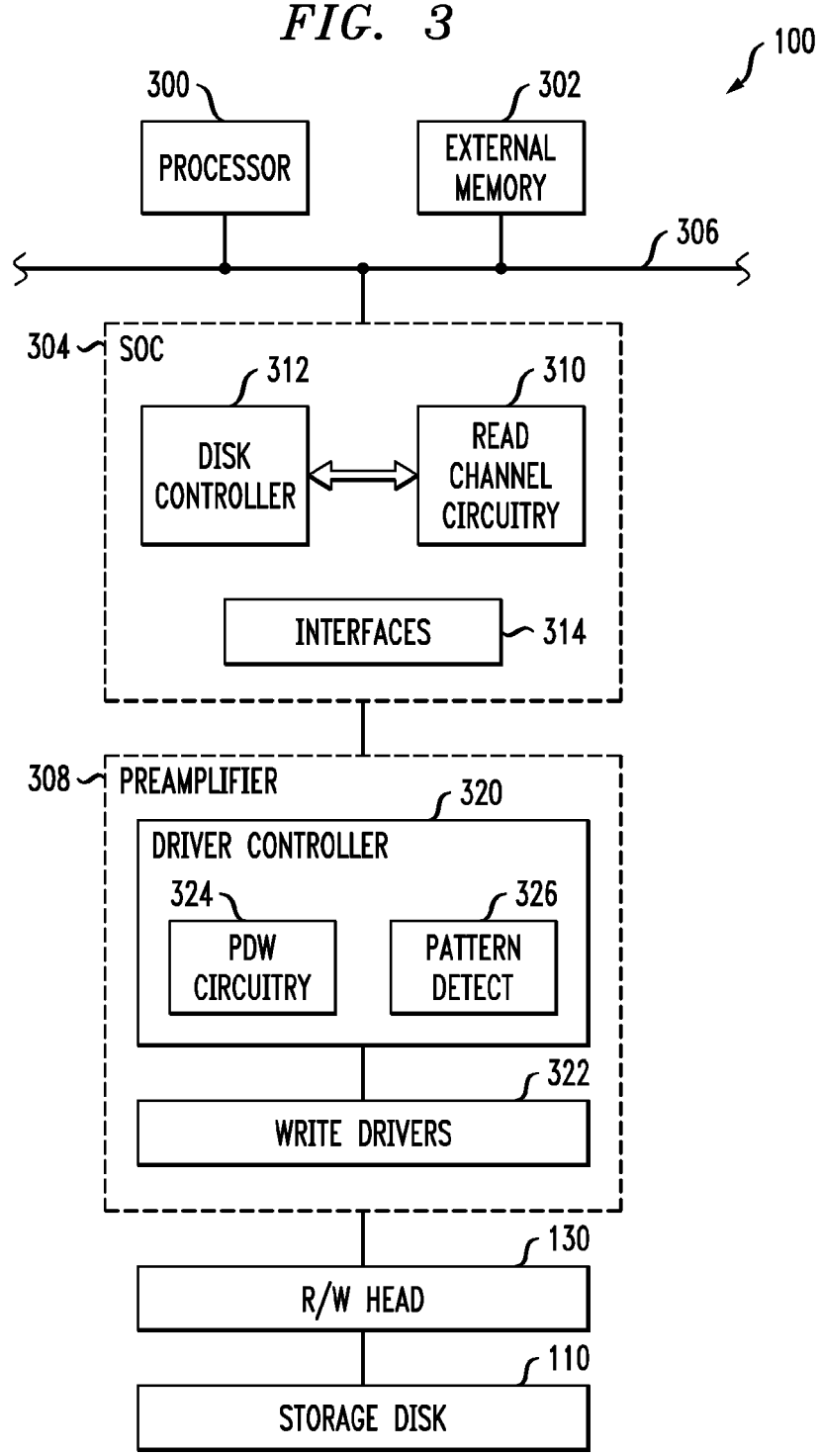
FIG. 3 is a block diagram of a portion of the storage device of FIG. 1 including a preamplifier comprising multiple write drivers and an associated driver controller.

FIG. 3 shows a portion of the storage device 100 of FIG. 1 in greater detail. In this view, the storage device 100 comprises a processor 300, a memory 302 and a system-on-a-chip (SOC) 304, which communicate over a bus 306. The storage device further comprises a preamplifier 308 providing an interface between the SOC 304 and the read/write head 130. The memory 302 is an external memory relative to the SOC 304 and other components of the storage device 100, but is nonetheless internal to that storage device. The SOC 304 in the present embodiment includes read channel circuitry 310 and a disk controller 312, and directs the operation of the read/write head 130 in reading data from and writing data to the storage disk 110.

The bus 306 may comprise, for example, one or more interconnect fabrics. Such fabrics may be implemented in the present embodiment as Advanced eXtensible Interface (AXI) fabrics, described in greater detail in, for example, the Advanced Microcontroller Bus Architecture (AMBA) AXI v2.0 Specification, which is incorporated by reference herein. The bus may also be used to support communications between other system components, such as between the SOC 304 and the preamplifier 308. It should be understood that AXI interconnects are not required, and that a wide variety of other types of bus configurations may be used in embodiments of the invention.

The processor 300, memory 302, SOC 304 and preamplifier 308 may be viewed as collectively comprising one possible example of "control circuitry" as that term is utilized herein. Numerous alternative arrangements of control circuitry may be used in other embodiments, and such arrangements may include only a subset of the components 300, 302, 304 and 308, or portions of one or more of these components. For example, the SOC 304 itself may be viewed as an example of "control circuitry." The control circuitry of the storage device 100 in the embodiment as shown in FIG. 3 is generally configured to process data received from and supplied to the read/write head 130 and to control positioning of the read/write head 130 relative to the storage disk 110.

It should be noted that certain operations of the SOC 304 in the storage device 100 of FIG. 3 may be directed by processor 300, which executes code stored in external memory 302. For example, the processor 300 may be configured to execute code stored in the memory 302 for performing at least a portion of a pattern-dependent write process carried out by the SOC 304. Thus, at least a portion of the pattern-dependent write functionality of the storage device 100 may be implemented at least in part in the form of software code. Such software code may also be stored and executed in other portions of the storage device, such as in memory and processor components of the SOC 304.

The external memory 302 may comprise electronic memory such as random access memory (RAM) or read-only memory (ROM), in any combination. In the present embodiment, it is assumed without limitation that the external memory 302 is implemented at least in part as a double data rate (DDR) synchronous dynamic RAM (SDRAM), although a wide variety of other types of memory may be used in other embodiments. The memory 302 is an example of what is more generally referred to herein as a "computer-readable storage medium." Such a medium may also be writable.

Although the SOC 304 in the present embodiment is assumed to be implemented on a single integrated circuit, that integrated circuit may further comprise portions of the processor 300, memory 302, bus 306 and preamplifier 308. Alternatively, portions of the processor 300, memory 302, bus 306 and preamplifier 308 may be implemented at least in part in the form of one or more additional integrated circuits, such as otherwise conventional integrated circuits designed for use in an HDD and suitably modified to implement pattern-dependent write functionality as disclosed herein.

An example of an SOC integrated circuit that may be modified for use in embodiments of the invention is disclosed in U.S. Pat. No. 7,872,825, entitled "Data Storage Drive with Reduced Power Consumption," which is commonly assigned herewith and incorporated by reference herein.

Other types of integrated circuits that may be used to implement processor, memory or other storage device components of a given embodiment include, for example, a microprocessor, digital signal processor (DSP), application-specific integrated circuit (ASIC), field-programmable gate array (FPGA) or other integrated circuit device.

In an embodiment comprising an integrated circuit implementation, multiple integrated circuit dies may be formed in a repeated pattern on a surface of a wafer. Each such die may include pattern-dependent write circuitry as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered embodiments of the invention.

Although shown as part of the storage device 100 in the present embodiment, one or both of the processor 300 and memory 302 may be implemented at least in part within an associated processing device, such as a host computer or server in which the storage device is installed. Accordingly, elements 300 and 302 in the FIG. 3 embodiment may be viewed as being separate from the storage device 100, or as representing composite elements each including separate processing or memory circuitry components from both the storage device and its associated processing device. As noted above, at least portions of the processor 300 and memory 302 may be viewed as comprising "control circuitry" as that term is broadly defined herein.

Referring now more particularly to the preamplifier 308 of the storage device 100, the preamplifier in this embodiment comprises a driver controller 320 and a plurality of associated write drivers 322. The driver controller 320 comprises pattern-dependent write (PDW) circuitry 324 and a pattern detector 326. The pattern-dependent write circuitry 324 is configured to provide a controlled amount of overshoot in each of a plurality of write pulses of a write signal generated by a given one of the write drivers 322. As will be described in greater detail below, this overshoot control involves use of a segmented digital-to-analog converter (DAC) that is assumed to be implemented in the pattern-dependent write circuitry 324.

Although multiple write drivers 322 are assumed to be present in this embodiment, other embodiments may include only a single write driver. A given write driver 322 in the present embodiment may comprise multiple distinct data paths, such as a high side data path and a low side data path, although different numbers of data paths may be used in other embodiments. It should be noted in this regard that the term "data path" as used herein is intended to be broadly construed, so as to encompass, for example, CMOS circuitry or other types of circuitry through which a data signal passes in preamplifier 308 or another storage device component.

Also, the term "write driver" is intended to encompass any type of driver circuitry that may be used to deliver or otherwise provide one or more write signals to the write head of the storage device 100. By way of example, the write drivers 322 may comprise pairs of X side and Y side drivers, with each such pair comprising both high side and low side drivers, where the X and Y sides are driven on opposite write cycles. These X and Y side driver pairs are also referred to herein as left side and right side driver pairs, respectively. Numerous alternative arrangements of circuitry are possible in other write driver embodiments.

Although illustratively shown in FIG. 3 as being separate from the write drivers 322, the driver controller 320 may alternatively be implemented at least in part internally to the write drivers 322.

The pattern-dependent write circuitry 324 is configured to control the overshoot amplitude of particular write pulses of a write signal responsive to patterns detected in write data by the pattern detector 326. For example, in some embodiments, when recording closely-spaced magnetic transitions of minimum run length, the magnetic state of a write head pole tip may not have sufficient time to become fully saturated. An aggressive overshoot setting is therefore used in this case to drive the pole tip quickly from one saturated state to the opposite saturated state, while a less aggressive overshoot setting being used in the case of longer run lengths preceding a current bit of write data.

The pattern-dependent write circuitry 324 is configured to provide such overshoot amplitude control for write pulses of a write signal by utilizing the above-noted segmented DAC. The segmented DAC in an illustrative embodiment uses thermometer coding for a designated number of most significant bits (MSBs) and binary weighting for the remaining least significant bits (LSBs), although different types of segmented DACs may be used in other embodiments. Also, it is assumed without limitation that separate segmented DACs are used to control overshoot and steady state portions of a given write pulse, although numerous other arrangements are possible. These two separate segmented DACs are also referred to herein as respective overshoot and steady state segmented DACs.

Figure 4:
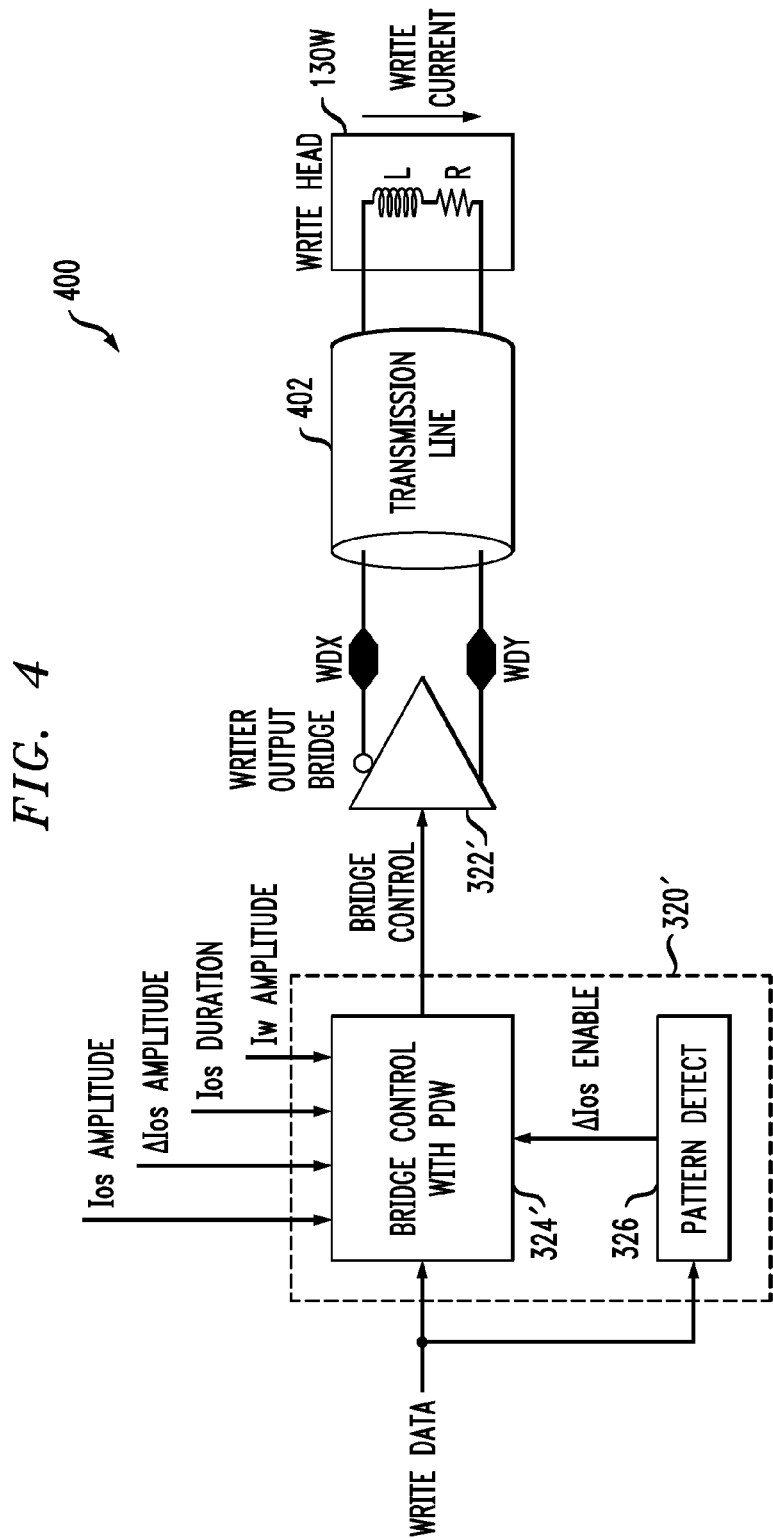
FIG. 4 shows a more detailed view of the preamplifier of FIG. 3 and its interconnection with a write head.

FIG. 4 shows a more detailed view of a portion 400 of the preamplifier 308 in one embodiment. In this embodiment, portion 400 comprises a driver controller 320' in which the pattern-dependent write circuitry is implemented within a bridge control module 324' coupled to the pattern detector 326. Write data to be recorded on storage medium 110 via the write head 130W is applied to inputs of the bridge control module 324' and the pattern detector 326. The bridge control module 324' is considered a type of pattern-dependent write circuitry as that latter term is broadly used herein.

As will be described, the bridge control module 324' provides pattern-dependent modulation of overshoot amplitude in write pulses of a current-mode write signal utilizing a segmented DAC. Other implementations of driver controller 320 and pattern-dependent write circuitry 324 need not be incorporated in or otherwise associated with a bridge control module, and hence the reference numerals 320' and 324' are used in place of the more general reference numerals 320 and 324 in this embodiment.

The write drivers in the FIG. 4 embodiment are illustratively shown as being arranged in the form of a writer output bridge 322' that is driven by bridge control outputs of the bridge control module 324'. The writer output bridge 322' in this embodiment includes X and Y side driver outputs denoted WDX and WDY, respectively, that drive the write head 130W via a transmission line 402. The write head 130 is modeled as a series arrangement of an inductor L and a resistor R, and receives a write signal from the writer output bridge 322' in the form of a write current as indicated.

The bridge control module 324' receives digital control signals specifying a base overshoot value, differential overshoot value, overshoot duration and steady state value for a given write pulse of the write signal. These control signals may be provided at least in part by other components of the storage device 100, such as processor 300 or SOC 304. Numerous other techniques for providing controllable parameters for the write pulses will be apparent to those skilled in the art.

In the context of the write current signal in the present embodiment, the base overshoot value, differential overshoot value, overshoot duration and steady state value are more particularly referred to as Ios amplitude, ΔIos amplitude, Ios duration and Iw amplitude, respectively. Here, Ios denotes base overshoot current of the write pulse and Iw denotes steady state current of the write pulse.

Figure 5:
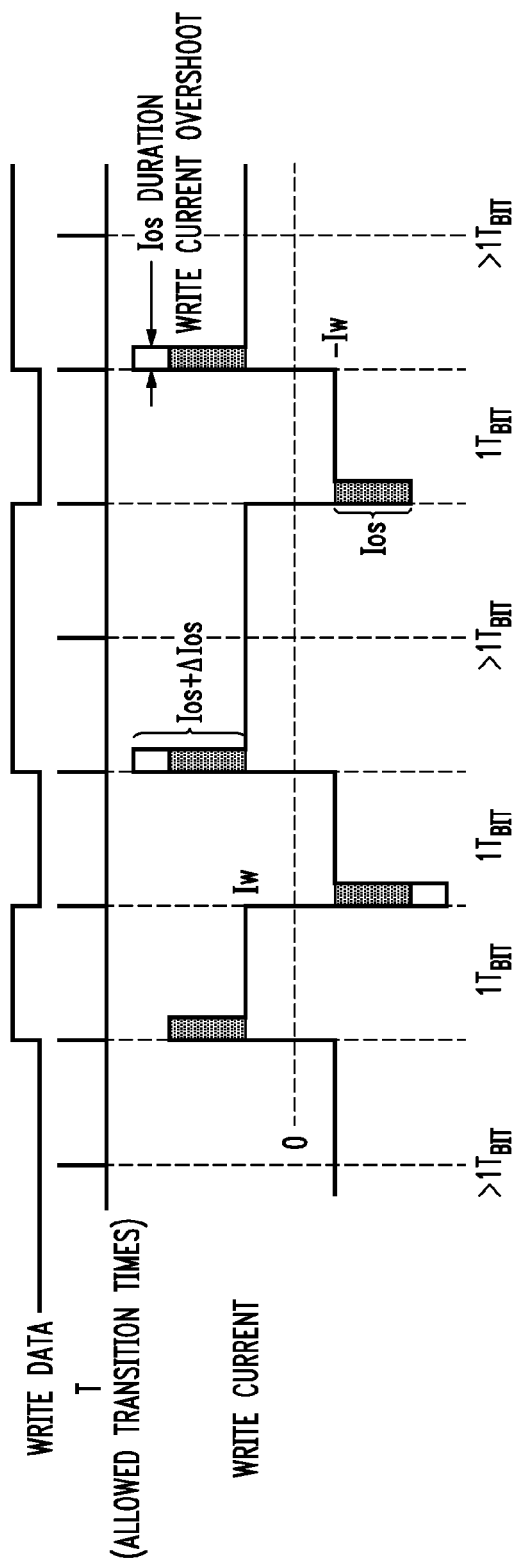
FIG. 5 is a timing diagram showing exemplary write data and a corresponding write signal comprising write pulses with different amounts of write current overshoot.

Exemplary write pulses are shown in the timing diagram of FIG. 5, which illustrates the write current generated responsive to write data in the FIG. 4 embodiment. It can be seen that a given write pulse has a steady state amplitude of Iw. Superimposed on each write pulse is an amount of overshoot amplitude that is either just the base overshoot amplitude Ios or an enhanced overshoot amplitude given by Ios+ΔIos. The write pulses can be positive or negative pulses, depending upon the logic state of the corresponding write data bits. Here, positive write pulses are used for binary "1" write data bits and negative write pulses for binary "0" write data bits. A positive write pulse has steady state amplitude Iw and overshoot amplitude Ios or Ios+ΔIos, and a negative write pulse has steady state amplitude −Iw and overshoot amplitude −Ios or −(Ios+ΔIos) as illustrated.

The write current through the write head 130W therefore alternates between steady state currents of ±Iw and the leading edge of each transition includes additional overshoot current of ±Ios or ±(Ios+ΔIos). It is to be appreciated, however, that this particular write signal configuration is presented for purposes of illustration only, and other embodiments may use different types of write signals having different write pulse shapes and configurations. For example, write pulses having multiple-slope data transitions may be used, as disclosed in U.S. patent application Ser. No. 13/416,443, filed Mar. 9, 2012 and entitled "Storage Device having Write Signal with Multiple-Slope Data Transition," which is commonly assigned herewith and incorporated by reference herein.

In the FIG. 5 example, the base overshoot amplitude Ios is used for those write pulses for which the corresponding write data bit is preceded by a write data pattern comprising a run length greater than a single bit period T, and the enhanced overshoot amplitude Ios+ΔIos is used for those write pulses for which the corresponding write data bit is preceded by a write data pattern comprising a run length equal to the single bit period T.

The pattern detector 326 is configured to detect these two distinct patterns in the write data and generates a ΔIos enable signal that selectively enables the enhanced overshoot amplitude responsive to detection of the pattern comprising a run length equal to the single bit period T. Thus, each write data bit that is preceded by this particular pattern will have its corresponding write pulse generated so as to include the enhanced overshoot amplitude superimposed on its steady state amplitude.

Accordingly, the pattern detector 326 in the present embodiment analyzes the input write data for conditions requiring introduction of the ΔIos increment. As will be described in more detail below in conjunction with FIGS. 9, 10 and 11, one implementation of the pattern detector utilizes a timer having a 3 T/2 duration, thereby allowing detection of the 1T and >1T run length patterns.

Numerous other types of patterns may be detected and utilized to adjust overshoot amplitude of one or more write pulses in other embodiments. For example, it is possible to introduce the ΔIos increment responsive to patterns having run lengths>2T or upon occurrence of a more complex pattern of preceding and/or subsequent multi-bit run lengths. In addition, other embodiments can be configured to support multiple pattern-dependent amplitude settings for ΔIos.

Additional details relating to one or more embodiments will now be described with reference to FIGS. 6, 7 and 8. These figures may be viewed as relating to different features of a single embodiment. Alternatively, multiple distinct embodiments may be configured using different combinations of the illustrated features. These embodiments are illustrative only, and other embodiments need not include the particular exemplary arrangements of FIGS. 6, 7 and 8, or other figures described herein.

Figure 6:
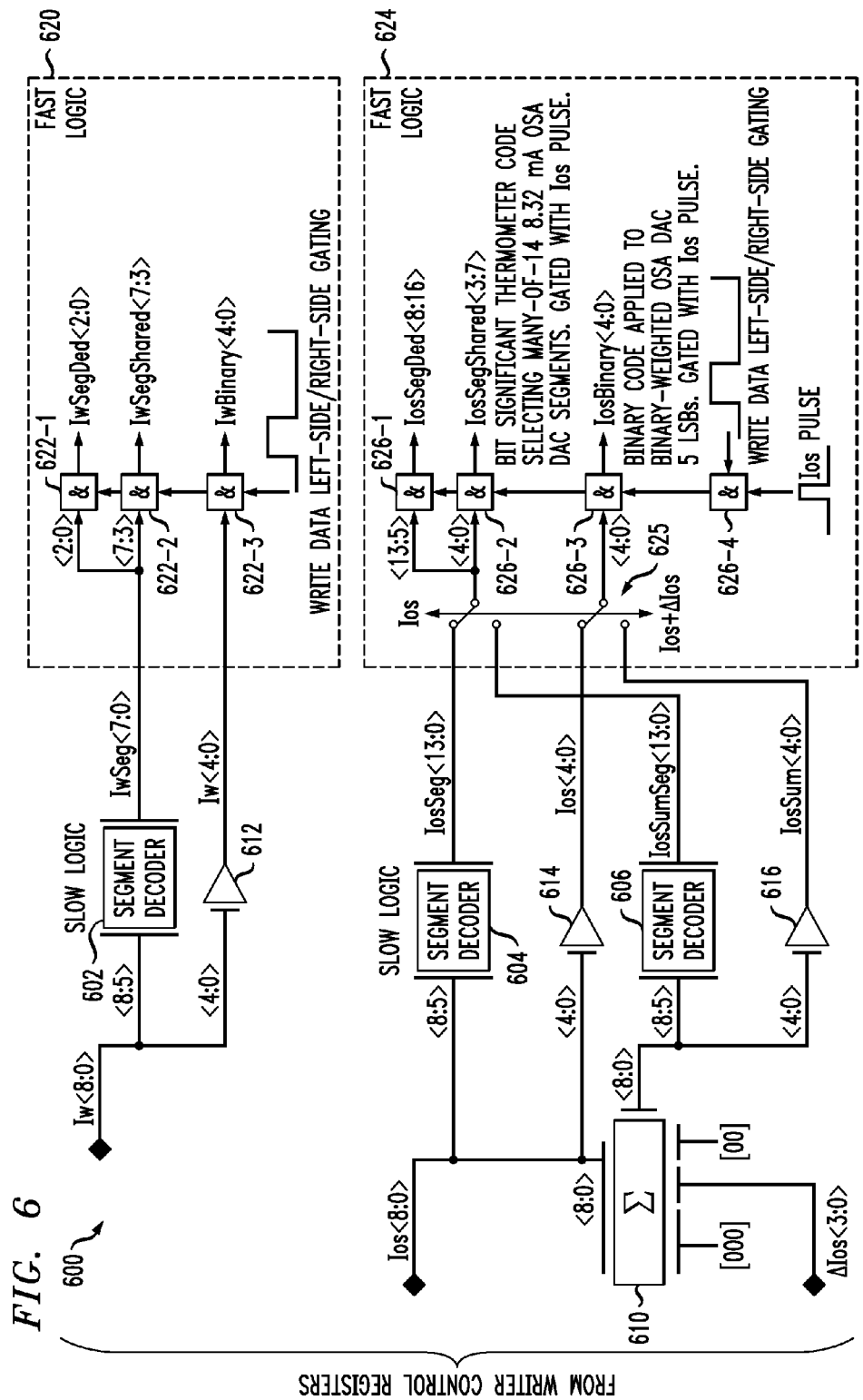
FIG. 6 shows a portion of the driver controller in the preamplifier of FIG. 3.

Referring now to FIG. 6, a portion 600 of the driver controller 320 is shown in greater detail. The portion 600 more particularly shows a more detailed view of the pattern-dependent write circuitry 324, including portions of steady state and overshoot segmented DACs that are used to generate write pulses of the type shown in FIG. 5. The steady state segmented DAC includes a segment decoder 602 and the overshoot segmented DAC comprises first and second segment decoders 604 and 606.

Also included in the portion 600 are an adder 610 and buffers 612, 614 and 616, and additional control circuitry 620 and 624. The buffers 612, 614 and 616 are paired with respective ones of the segment decoders 602, 604 and 606. These elements and adder 610 are illustratively implemented using relatively slow logic to precompute control quantities, while the additional control circuitry 620 and 624 is illustratively implemented using relatively fast logic to select between the precomputed control quantities, as indicated in the figure. The adder 610 is an example of what is more generally referred to herein as a "combiner," and other types of combiners may be used in other embodiments.

In the exemplary arrangement illustrated in FIG. 6, digital values are received from writer control registers that are implemented in the driver controller 320 or another part of the preamplifier 308 or storage device 100. These digital values in the present embodiment illustratively include a nine-bit steady state value Iw<8:0>, a nine-bit base overshoot value Ios<8:0>, and a four-bit differential overshoot value ΔIos<3:0>.

The steady state value Iw<8:0> includes first and second portions comprising bits <8:5> and <4:0> that are applied to the segment decoder 602 and the buffer 612, respectively.

Similarly, the base overshoot value Ios<8:0> includes first and second portions comprising bits <8:5> and bits <4:0> that are applied to the segment decoder 604 and the buffer 614, respectively.

The differential overshoot value ΔIos<3:0> is applied to an input of adder 610 which is configured to form a combination of the base overshoot value Ios<8:0> and the differential overshoot value ΔIos<3:0>. More particularly, the adder 610 in the present embodiment forms the combination as a sum of the base overshoot value and a shifted version of the differential overshoot value. The shifted version is shifted by three bit places as indicated in the figure, which corresponds to a multiplication of the differential overshoot value by a factor of $2^3=8$. Thus, in this embodiment the LSB weight of ΔIos is eight times that of Ios. For example, if Ios LSB=0.281 mA, then ΔIos LSB=2.248 mA, although other LSB current weightings could be used.

Accordingly, in the present embodiment, the nine-bit Ios value is summed with a left-shifted version of the four-bit ΔIos value to produce the nine-bit (Ios+ΔIos) value, also more generally referred to herein as a combination of the base overshoot value and the differential overshoot value.

The resulting combination of the base overshoot value and the differential overshoot value includes first and second portions comprising bits <8:5> and bits <4:0> that are applied to the segment decoder 606 and the buffer 616, respectively.

The outputs of the segment decoders 602, 604 and 606 are denoted as respective values IwSeg<7:0>, IosSeg<13:0> and IosSumSeg<13:0>. These are thermometer coded values associated with the thermometer coding parts of the respective steady state and overshoot segmented DACs, where the thermometer code is configured such that a "1" bit of the code activates an associated driver bit position and a "0" bit of the code maintains an associated driver bit position in an off state. More particularly, IwSeg<7:0> denotes a particular number of eight steady state thermometer code segments S0 through S7, and each of IosSeg<13:0> and IosSumSeg<13:0> denotes a particular number of 14 overshoot thermometer code segments S3 through S16. Only one of the IosSeg<13:0> and IosSumSeg<13:0> values is selected for use at a given time, depending on the value of the ΔIos enable signal.

The outputs of the buffers 612, 614 and 616 are denoted as respective values Iw<4:0>, Ios<4:0> and IosSum<4:0>. These are binary coded values associated with the binary weighting parts of the respective steady state and overshoot segmented DACs. More particularly, Iw<4:0> denotes a particular one of $2^5=32$ steady state binary coded values, and each of Ios<4:0> and IosSum<4:0> denotes a particular one of $2^5=32$ overshoot binary coded values. Only one of the Ios<4:0> and IosSum<4:0> values is selected for use at a given time, again depending on the value of the ΔIos enable signal.

The additional control circuitry 620 comprises AND gates 622-1, 622-2 and 622-3, all of which are gated by a pulse indicating activation of a left side or right side driver. These AND gates 622 also receive as respective inputs the values IwSeg<2:0>, IwSeg<7:3> and Iw<4:0>, and generate respective outputs denoted IwSegDed<2:0>, IwSegShared<7:3> and IwBinary<4:0>. In this way, polarity alternation of write current is achieved as illustrated in FIG. 5.

The two outputs IwSegDed<2:0> and IwSegShared<7:3> of respective AND gates 622-1 and 622-2 collectively provide a thermometer coded output indicating selection of a particular number of the above-noted eight segments S0 through S7 and corresponding to MSBs of the steady state segmented DAC. Each such segment illustratively represents an 8.32 mA DAC segment, corresponding to 32 LSBs at an LSB value of 0.260 mA, although other per segment current values could be used. The output IwBinary<4:0> of AND gate 622-3 is a binary coded output corresponding to five LSBs of the steady state segmented DAC, with the DAC weight being 31 LSB=8.06 mA at an LSB value of 0.260 mA.

The additional control circuitry 624 includes switching circuitry 625 and AND gates 626-1, 626-2, 626-3 and 626-4. These AND gates are all gated by an Ios pulse as indicated. The AND gate 626-4 also receives as an input the above-noted pulse indicating activation of a left side or right side driver, and the output of this AND gate is a pulse that is applied to each of the other AND gates 626-1, 626-2 and 626-3.

The selection circuitry 625 illustratively comprises a pair of single-throw double-pole switches configured to select between the base overshoot amplitude given by Ios and the enhanced overshoot amplitude given by Ios+ΔIos. The selection is made responsive to the ΔIos enable signal generated by the pattern detector 326.

The upper switch of the switching circuitry 625 selects between thermometer coded value IosSeg<13:0> at the output of segment decoder 604 and thermometer coded value IosSumSeg<13:0> at the output of segment decoder 606.

The lower switch of the switching circuitry 625 selects between binary coded value Ios<4:0> at the output of buffer 614 and binary coded value IosSum<4:0> at the output of buffer 616.

The switching circuitry 625 is an example of what is more generally referred to herein as switching circuitry coupled to first and second segment decoders and configured to select between a number of base overshoot segments as determined by the first segment decoder and a number of enhanced overshoot segments as determined by the second segment decoder responsive to detection of a particular pattern by the pattern detector. Numerous other types and arrangements of switches may be used in implementing such switching circuitry in other embodiments.

The AND gates 626-1, 626-2 and 626-3 receive the selected values from the switching circuitry 625. More particularly, AND gates 626-1 and 626-2 receive respective <13:5> and <4:0> portions of the selected one of the IosSeg<13:0> and IosSumSeg<13:0> values and generate outputs denoted IosSegDed<8:16> and IosSegShared<3:7>. These two outputs collectively provide a thermometer coded output indicating selection of a particular number of the above-noted 14 segments S3 through S16 and corresponding to MSBs of the overshoot segmented DAC.

As in the steady state case previously described, each such segment illustratively represents an 8.32 mA DAC segment, corresponding to 32 LSBs at an LSB value of 0.260 mA, although other per segment current values could be used. The AND gate 626-3 receives the selected one of the Ios<4:0> and IosSum<4:0> and generate an output denoted IosBinary<4:0>. Like the corresponding steady state output, this overshoot output is a binary coded output corresponding to five LSBs of the overshoot segmented DAC, with the DAC weight being ≤31 LSB=8.06 mA at an LSB value of 0.260 mA.

The overshoot amplitude for a given one of the write pulses of the write signal is determined at least in part as a function of the selected one of the number of base overshoot segments and the number of enhanced overshoot segments. More particularly, the overshoot amplitude for the given write pulses is determined in the present embodiment as a function of the selected one of the number of base overshoot segments IosSeg<13:0> and the number of enhanced overshoot segments IosSumSeg<13:0> together with the binary coded overshoot value IosBinary<4:0>.

The steady state amplitude for the given write pulse of the write signal is determined at least in part as a function of the number of steady state segments. More particularly, the steady state amplitude for the given write pulses is determined in the present embodiment as a function of the number of steady state segments IwSeg<7:0> together with the binary coded steady state value IwBinary<4:0>.

As illustrated in FIG. 6, a subset of the steady state segments comprise shared segments that also serve as corresponding ones of the overshoot segments. These shared segments are denoted in the figure as IwSegShared<7:3> in the context of the steady state segmented DAC and IosSegShared<3:7> in the context of the overshoot segmented DAC. The overlap between the segments will be described in greater detail below with reference to FIG. 8.

Figure 7:
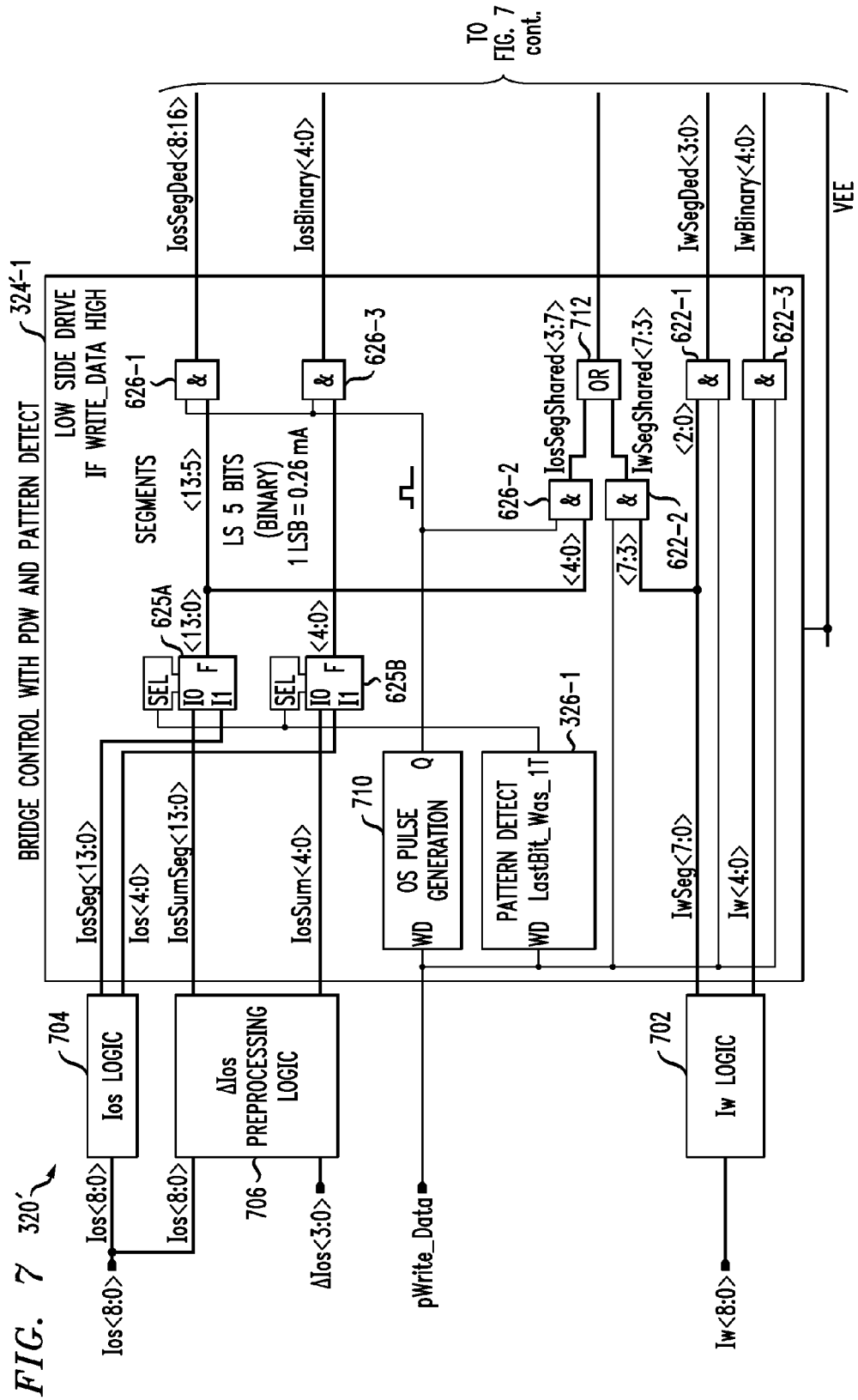
FIG. 7 illustrates one possible implementation of the driver controller in an embodiment with separate pairs of high side and low side write drivers.
Figure 7:
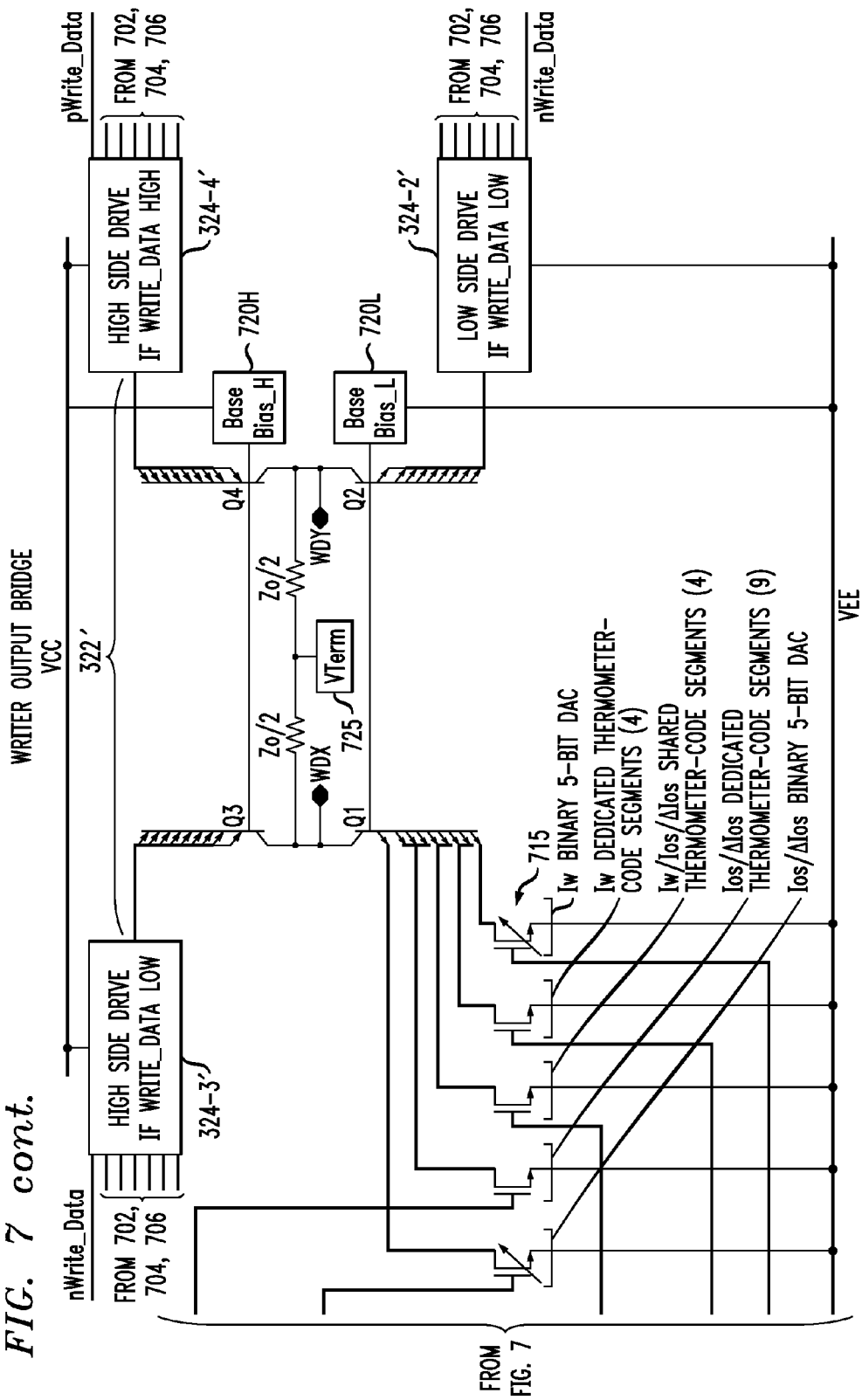

Referring now to FIG. 7, separate pairs of high side and low side write drivers are shown, along with multiple instances of the driver controller of FIG. 4, each including part of the control circuitry previously described in conjunction with FIG. 6. The writer output bridge 322' in this diagram more particularly comprises write drivers implemented using output transistors generally denoted as Q1, Q2, Q3 and Q4. Transistors Q1 and Q2 are low side drivers utilized for logic high and logic low write data bits, respectively. Similarly, transistors Q3 and Q4 are high side drivers utilized for logic low and logic high write data bits, respectively.

The Q1 and Q2 transistors are bipolar n-p-n transistors and the Q3 and Q4 transistors are bipolar p-n-p transistors. Each such transistor is illustratively shown as comprising multiple emitters. The collectors of Q1 and Q3 are coupled to the WDX output terminal and the collectors of Q2 and Q4 are coupled to the WDY output terminal. As indicated in FIG. 4, these terminals drive upper and lower conductors of transmission line 402 coupled to write head 130W.

As illustrated in FIG. 7, a driver controller 320' more particularly comprises four instances of a bridge control module similar to that illustrated in FIG. 4, with these multiple bridge control module instances being denoted as 324'-1, 324'-2, 324'-3 and 324'-4 and being configured to control the current through write driver output transistors Q1, Q2, Q3 and Q4, respectively. The bridge control modules in this embodiment differ from the module previously described in conjunction with FIG. 4 in that the FIG. 7 bridge control modules incorporate respective instances of pattern detectors 326-1, 326-2, 326-3 and 326-4. In the FIG. 4 embodiment, the pattern detector was shown as external to the bridge control module. It should be noted in this regard that use of duplicated pattern detectors reduces time skew between bridge legs, and reduces the number of level shifters.

Each bridge control module also includes a portion of the FIG. 6 circuitry, including AND gates 622-1, 622-2, 622-3, 626-1, 626-2 and 626-3. The AND gate 626-4 of FIG. 6 is assumed to be incorporated into an overshoot pulse generator 710 which is implemented in each of the bridge control modules. Also incorporated into each of the bridge control modules is switching circuitry 625 which in this figure is more particularly shown as comprising switch 625A and switch 625B.

The bridge control modules in the present embodiment all share a single instance of each of Iw logic 702, Ios logic 704 and ΔIos preprocessing logic 706. Such shared elements are considered to be part of the overall driver controller 320' in this embodiment, and are configured to incorporate the respective segment decoders 602, 604 and 606 and respective buffers 612, 614 and 616 of FIG. 6. Also, the ΔIos preprocessing logic 706 is assumed to incorporate the adder 610. As indicated previously, the segment decoders 602, 604, 606, adder 610 and buffers 612, 614 and 616 are constructed using low-speed or relatively slow logic. Again, these elements are shared by all of the bridge control modules, which are implemented using high-speed or relatively fast logic. This arrangement allows the precomputation of both Ios and (Ios+ΔIos) values and switching between these two values at high speed immediately before application to the writer output bridge 322'.

The outputs of the bridge control module 324'-1 previously described in conjunction with FIG. 6 drive gates of respective N-type metal-oxide-semiconductor (MOS) transistors 715 of the writer output bridge 322' as indicated in FIG. 7. The drains of these NMOS transistors are coupled to respective subsets of one or more of the emitters of Q1, and their sources are connected to a lower supply voltage denoted VEE. A given such transistor may more particularly comprise a set of weighted transistors, and the transistors 715 may therefore be referred to herein as respective sets of weighted transistors, with each such set being driven by one of the five outputs IwBinary<4:0>, IwSegDed<2:0>, IwSegShared<7:3>, IosSegDed<8:16> and IosBinary<4:0> of the bridge control module 324'-1.

Each emitter in the present embodiment is weighted to correspond to 32 LSB current units. The five-bit DAC and its associated emitter driven by gate 622-3 delivers a current in the range of 0-31 units, while other emitters when activated pass a 32-unit current. Alternative weightings and emitter configurations can be used.

Each of the other bridge control modules 324'-2, 324'-3 and 324'-4 is assumed to be configured in a similar manner relative to its corresponding one of the write driver output transistors Q2, Q3 and Q4, although the associated sets of MOS transistors of the writer output bridge 322' are omitted from the figure for simplicity and clarity of illustration. Also, the low side bridge control modules 324'-1 and 324'-2 and their associated sets of NMOS transistors are coupled to the lower supply voltage VEE, but the high side bridge control modules 324'-3 and 324'-4 are coupled to an upper supply voltage VCC and will have their outputs coupled to sets of P-type MOS (PMOS) transistors instead of NMOS transistors.

In addition, the write data inputs of bridge control modules 324'-1 and 324'-4 that operate on high write data are denoted pWrite_Data and the write data inputs of bridge control modules 324'-2 and 324'-3 that operate on low write data are denoted nWrite_Data. The write data is also generally referred to as Write Data in the diagram.

Each of these bridge control modules 324' also receives as additional inputs the signals generated by elements 702, 704 and 706, which as noted previously are shared by the bridge control modules in the present embodiment.

It should be noted that the outputs of elements 702, 704 and 706, as well as the write data signals associated with the pWrite_Data and nWrite_Data inputs, are assumed to be shifted to VCC and VEE referenced levels by level shifters that are not shown in FIG. 7.

The bipolar transistors Q1, Q2, Q3 and Q4 are configured in a cascode configuration in order to screen the MOS transistors from the high voltage swings appearing across the transmission line 402 and write head 103W.

The write output bridge 322' in the present embodiment may be viewed as comprising four quadrants, with diagonally opposed quadrants being simultaneously conductive in order to achieve write current polarity switching. Thus, Q1 and Q4 are simultaneously conductive for logic high write data bits, and Q2 and Q3 are simultaneously conductive for logic low write data bits. Top and bottom quadrants in this embodiment are of similar design, but employ complementary output devices and are referenced, respectively, to the upper and lower supply voltages VCC and VEE. Such an arrangement allows bidirectional current flow through the write head 130W. Separate high and low base bias circuits 720H and 720L are coupled to the bases of respective pairs of transistors Q3, Q4 and Q1, Q2. The base bias circuits 720H and 720L are coupled to the respective high and low supply voltages VCC and VEE.

In order to suppress reflections in the transmission line 402 connecting the writer output bridge 322' to the write head 130W, the output terminals WDX and WDY are coupled via respective impedances $Z_0/2$ to a termination voltage 725, where $Z_0$ denotes the characteristic impedance of the transmission line 402. The termination voltage 725 is a common-mode potential given by (VCC+VEE)/2.

In an exemplary embodiment configured in the manner illustrated in one or more of FIGS. 6 and 7, the switching circuitry 625 may be implemented using multiplexers or other switches to select between the Ios and (Ios+ΔIos) segment paths. However, it should also be appreciated that alternative types of switching circuitry may be used. For example, the switching circuitry may comprise a logic circuit configured to perform a logical OR of the number of base overshoot segments and the number of enhanced overshoot segments in order to effectively select between the numbers of segments. More particularly, because (Ios+ΔIos) Ios, an equivalent selection method can be implemented using a logical OR of the (Ios+ΔIos) and Ios segment paths. Such an arrangement allows the segment decoder 606 to exploit "don't care" values in order to reduce complexity.

Figure 8:
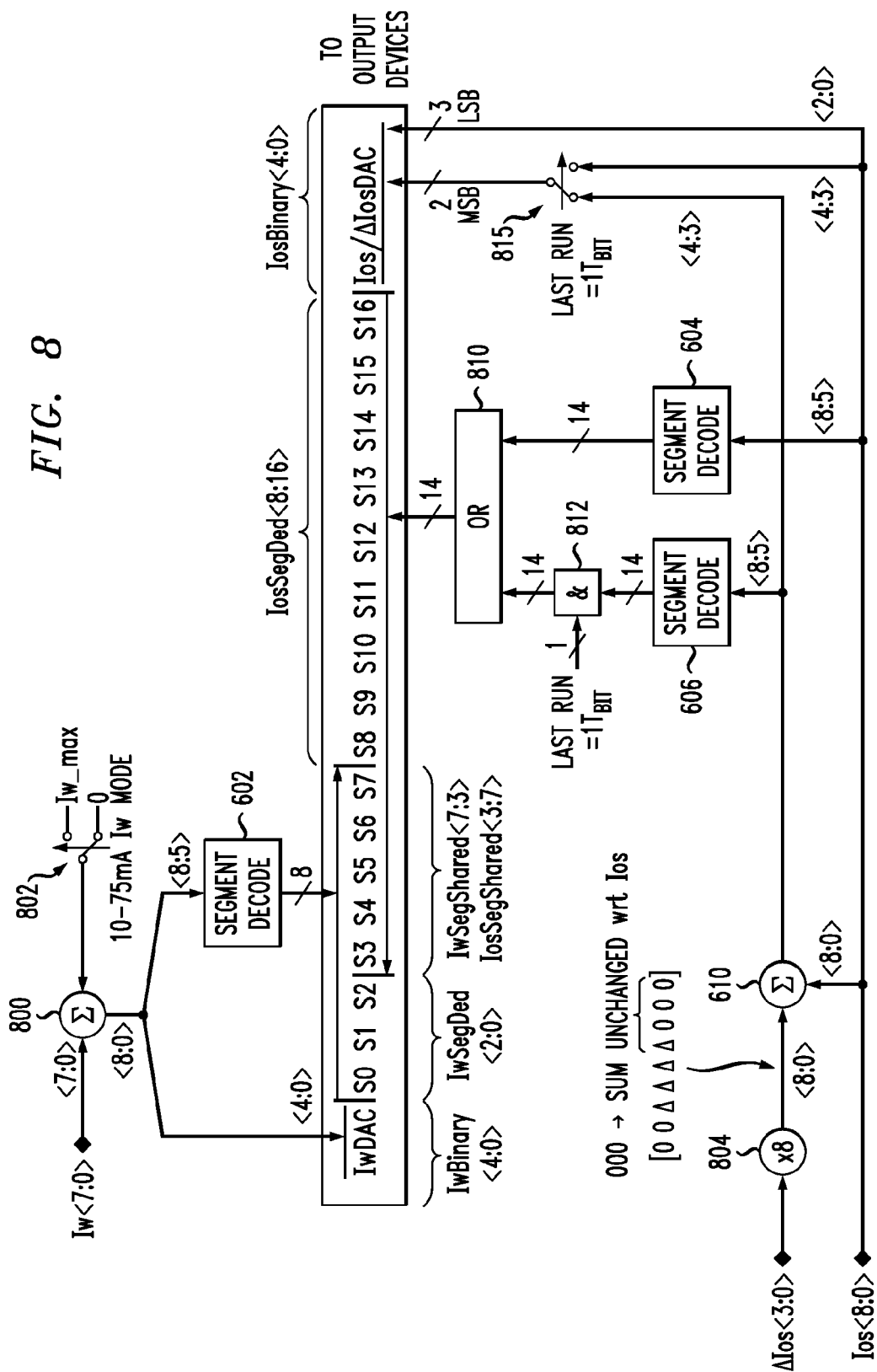
FIG. 8 illustrates a portion of the driver controller associated with segment selection in generating a given write pulse of a write signal.

This use of logical OR to select between the Ios and (Ios+ΔIos) segment paths is illustrated in FIG. 8, along with other features of illustrative embodiments. This figure shows the segment decoders 602, 604 and 606 as previously described, and illustrates the manner in which the outputs generated by a given one of the bridge control modules 324' are arranged for application to corresponding output devices of a writer output bridge 322'. There are five distinct outputs in this embodiment, each of which is applied to a corresponding one of the five sets of NMOS transistors 715 of FIG. 7. More particularly, the five outputs comprise IwBinary<4:0>, IwSegDed<2:0>, IwSegShared<7:3>, IosSegDed<8:16> and IosBinary<4:0> as indicated above. The IwBinary<4:0> and IosBinary<4:0> outputs comprise binary coded outputs associated with binary weighting parts of the respective steady state and overshoot segmented DACs.

The IwSegDed<2:0>, IwSegShared<7:3> and IosSegDed<8:16> outputs are thermometer coded outputs associated with the thermometer coding parts of the steady state and overshoot segmented DACs, with the dedicated segments S0 through S2 being dedicated to the steady state segmented DAC, the dedicated segments S8 through S16 being dedicated to the overshoot segmented DAC, and the remaining segments S3 through S7 being shared between the two segmented DACs. The segments "illuminate" in accordance with the thermometer code with increasing or decreasing segment count, as indicated by the respective horizontal arrows above or below the segment names in the figure.

In the present embodiment, five segments S3 through S7 are common to the Iw and Ios/(Ios+ΔIos) segment paths.

Limits are imposed on Iw, Ios, and ΔIos to preclude simultaneous activation of a shared segment.

FIG. 8 also illustrates additional processing associated with generation of the bridge control outputs. For example, in this embodiment, an eight-bit steady state value Iw<7:0> is extended to a nine-bit value Iw<8:0> using an adder 800 and switch 802. These elements may be configured to support an Iw mode in which Iw can vary between about 10 and 75 mA via operation of switch 802 between zero and maximum levels. Also, differential overshoot value ΔIos is shifted to the left by three bit places using a ×8 multiplier 804 and then combined with the base overshoot value Ios<8:0> in adder 610. Switching circuitry comprising AND gate 812 and switch 815 operates in this embodiment responsive to detection of a particular pattern, in this case a prior run length equal to T indicating application of the enhanced overshoot amplitude to the write pulse.

As indicated above, the arrangement shown in FIG. 8 takes advantage of the fact that (Ios+ΔIos)≥Ios, thus allowing a logical OR between Ios and (Ios+ΔIos) segment paths. This logical OR is implemented using OR gate 810. Such an OR gate is considered to be encompassed by the general term "switching circuitry" as used herein, as are elements such as AND gate 812 and switch 815.

Some embodiments are configurable to provide write pulses having steady state currents in the range 0≤Iw≤(31+8×32)×LSB, base overshoot currents in the range 0≤Ios≤(31+14×32)×LSB, and differential overshoot currents in the range 0≤ΔIos≤15×8×LSB, with relative Iw, Ios, and ΔIos contributions being constrained to prevent simultaneous activation of shared segments. In these embodiments, as indicated previously, the LSB value may be given, as one possible example, by 0.260 mA, with the segment weight being equal to 32 LSB=8.32 mA and the DAC weight being 31 LSB=8.06 mA. Numerous alternative values, ranges, settings and other parameters may be used in other embodiments.

For example, as mentioned above, other embodiments can be configured to accommodate multiple ΔIos values, denoted $\Delta Ios_k$ where k=1, 2, . . . K, each associated with a specific pattern in the write data. For each such value $\Delta Ios_k$, an adder and associated segment decoder similar to respective adder 610 and segment decoder 606 are provided, along with corresponding straightforward modifications to the switching circuitry and pattern detector to accommodate the additional segment paths and patterns.

Exemplary embodiments of the pattern detector 326 will now be described with reference to FIGS. 9, 10 and 11.

Figure 9:
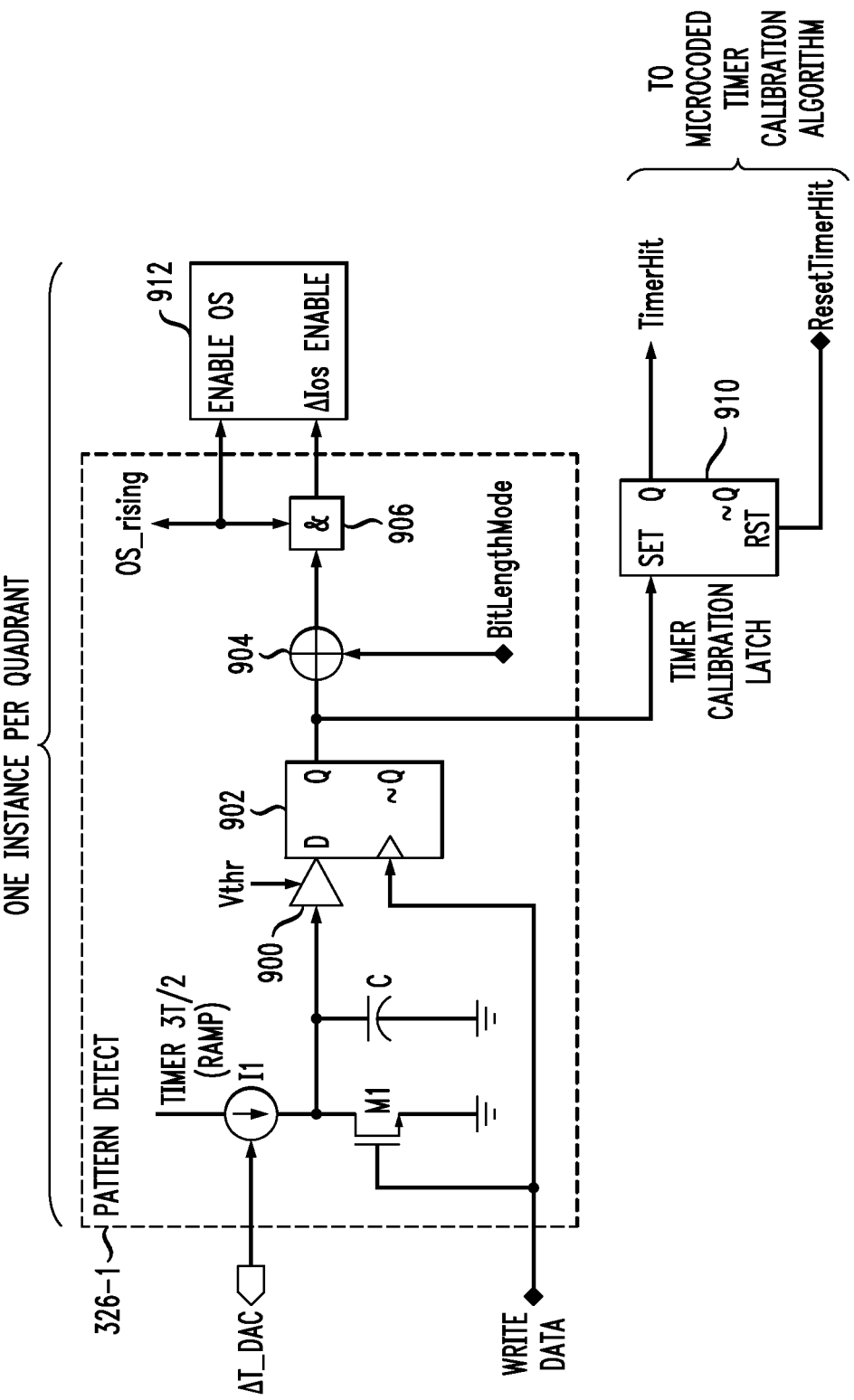
FIG. 9 shows a pattern detector of the driver controller in an illustrative embodiment.

Referring initially to FIG. 9, a separate instance of the pattern detector shown is assumed to be implemented for each quadrant of the writer output bridge 322'. The particular pattern detector in the figure is identified as pattern detector 326-1, implemented in the bridge control module 324'-1 of FIG. 7. The pattern detector 326-1 in this embodiment is configured to distinguish between a pattern having a run length equal to T and a pattern having a run length greater than or equal to 2T, where T denotes a single bit period of the write data, although as noted above other patterns could be detected in other embodiments and utilized to adjust overshoot amplitude for one or more write pulses.

The exemplary pattern detector 326-1 as illustrated in FIG. 9 comprises a ramp circuit that includes a programmable current source I1, an input NMOS transistor M1 and a capacitor C. The ramp circuit is configured to generate a ramp signal that is reset to an initial value in conjunction with each of a plurality of transitions in the write data. More particularly, the ramp circuit is configured such that the ramp signal ramps from its initial value to its final value in a period of time given approximately by 3T/2, so as to facilitate distinguishing between run lengths equal to T and run lengths greater than or equal to T.

In some embodiments, a single ramp circuit may be shared between multiple instances of the pattern detector. For example, although the inclusion of a separate such circuit in each quadrant of the writer output bridge accommodates ping-ponging and eliminates the need for high-speed level shifting between circuitry referenced to the two supply rails, it is possible to use only two ramp circuits arranged in a ping-pong configuration if high-speed rail-to-rail level shifting is permitted.

The ramp circuit is coupled to a latch circuit that illustratively comprises a threshold device 900 that drives a data input of a low-metastability master-slave flip-flop 902. The flip-flop 902 is clocked by the write data that is also applied to the gate of NMOS transistor M1. The latch circuit further comprises an XOR gate 904 and an AND gate 906. The XOR gate 904 receives as its inputs the data output Q of the flip-flop 902 and a BitLengthMode signal which allows a user to selectively enable Ios enhancement for run lengths equal to T or for run lengths greater than or equal to 2T. The AND gate 906 receives as its inputs an OS_rising signal and the output of XOR gate 904.

The latch circuit is configured to generate a pattern detection output signal based at least in part on whether or not the ramp signal reaches a final value after being initiated by one transition and prior to being reset by an immediately following transition. The pattern detection output signal in this embodiment illustratively comprises the ΔIos enable signal described elsewhere herein, which is shown in FIG. 9 as part of a set of signals 912 that also includes an overshoot enable signal. It should be understood that different ramp and latch circuit arrangements may be used in other embodiments, or more generally other types and configurations of pattern detectors.

Also shown in FIG. 9 is a timer calibration latch 910 that is part of timer calibration circuitry configured to adjust one or more parameters of the ramp circuit during a calibration mode of operation of the pattern detector 326-1. Such calibration may be used, for example, to nullify adverse effects of die process variations. The timer calibration circuitry comprises a microcoded timer calibration algorithm that evaluates a timer hit signal TimerHit generated by the latch circuit 910 under different control input conditions of the ramp circuit, as will be described in more detail below in conjunction with FIG. 11. The timer calibration latch receives as its set input the output of the flop-flop 902, and generates an output corresponding to the timer hit signal. The microcoded timer calibration algorithm provides a reset timer hit signal denoted ResetTimerHit to the reset input of the timer calibration latch 910.

Figure 10:
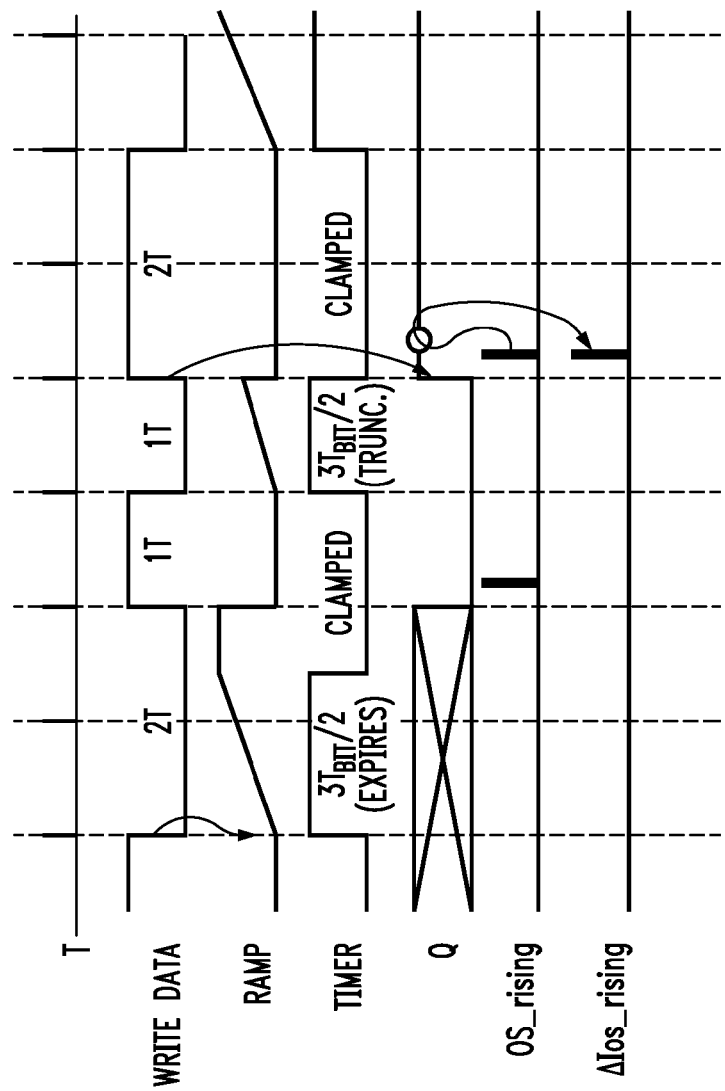
FIG. 10 is a timing diagram illustrating operation of the pattern detector of FIG. 9.

A timing diagram illustrating the operation of the exemplary pattern detector 326-1 of FIG. 9 is shown in FIG. 10. The capacitor C is permitted to charge from the programmable current source I1 when the write data is at a logic low level and M1 is off. Upon return of the write data to a logic high level, M1 is turned on, the state of the capacitor voltage Vcap relative to threshold Vthr is edge-clocked into the master-slave flip-flop 902, and the capacitor is discharged through M1 in preparation for the next logic low interval of the write data. If the capacitor voltage Vcap is less than the threshold Vthr when clocked into flip-flop 902, it is determined that the immediately-preceding run length is equal to T, such that the current write data bit qualifies for Ios enhancement by ΔIos. Thus, the ΔIos enable signal is activated, as indicated by the narrow pulse of ΔIos_rising in the timing diagram of FIG. 10.

In this diagram, each narrow pulse of OS_rising indicates a rising transition in the write data to which overshoot is applied in the corresponding write pulse, and the narrow pulse of ΔIos_rising indicates that the overshoot will be applied in the corresponding write pulse with enhanced amplitude as previously described.

As mentioned above, the BitLengthMode signal applied to XOR gate 904 allows selection of one of two alternative Ios enhancement modes in this embodiment, namely, enhancement for prior run lengths equal to T or enhancement for prior run lengths greater than or equal to 2T. It is assumed that the BitLengthMode signal is configured so as to select Ios enhancement for prior run lengths equal to T.

Referring now to FIG. 11, exemplary pseudocode is shown for implementing the above-noted microcoded timer calibration algorithm. This calibration algorithm is illustratively implemented in microcode stored in a memory of the preamplifier 308, SOC 304 or another portion of the storage device 100. As indicated previously, the timer calibration algorithm evaluates the timer hit signal TimerHit generated by the timer calibration latch 910 under different control input conditions of the ramp circuit. The timer calibration algorithm is configured to cancel fixed process and geometric tolerances affecting timer duration so as to provide an optimum 3T/2 timer setting. The different control input conditions in this embodiment comprise first and second sets of input conditions.

In the first set of input conditions, the timer hit signal TimerHit is evaluated at respective minimum and maximum values of a ramp control signal ΔT_DAC with test write data WD being set to exhibit a first specified run length, namely, WD=1T. This involves applying square wave write data of period 1T to the pattern detector, and sweeping a timer duration register through each of multiple duration steps. For each of the duration steps, the TimerHit signal indicating whether the timer has elapsed during a given bit period is monitored.

In the second set of input conditions, the timer hit signal TimerHit is evaluated at respective minimum and maximum values of the ramp control signal ΔT_DAC with test write data WD being set to exhibit a second specified run length different than the first specified run length, namely, WD=2T. This involves applying square wave write data of period 2T to the pattern detector, and sweeping the timer duration register through each of multiple duration steps. For each of the duration steps, the TimerHit signal indicating whether the timer has elapsed during a given bit period is monitored.

Based on testing under the first and second sets of input conditions above, respective 1T and 2T values for the ramp control signal ΔT_DAC are obtained, and these values are averaged to determine the appropriate 3T/2 value.

The pattern detector arrangements described above are exemplary only, and alternative techniques can be used. For example, pattern detection may be based on run length information transmitted from the SOC 304 to the preamplifier 308. Also, local preamplifier-based pattern analysis may be implemented using phase-locked loop clocking.

One or more of the embodiments of the invention provide significant improvements in disk-based storage devices as well as other types of storage devices. For example, by utilizing write signals having write pulses with pattern-dependent overshoot amplitude modulation implemented in the manner disclosed herein, write head magnetization states can more easily reach saturated conditions. This can significantly improve on-track and off-track recording performance, particularly at high data rates.

Illustrative embodiments provide these advantages utilizing digital control signals applied to a segmented DAC. This allows pattern-dependent write functionality to be provided in a storage device without increasing write driver output device area or capacitance. Also, the impact of process and geometry variations on performance is considerably reduced through the use of timer calibration circuitry that can be implemented at least in part utilizing a microcoded timer calibration algorithm.

It is to be appreciated that the particular circuitry arrangements, write signal waveforms and signal configurations shown in FIGS. 3-11 are presented by way of example only, and other embodiments of the invention may utilize other types and arrangements of elements for implementing pattern-dependent write functionality for one or more write signals as disclosed herein.

As mentioned previously, the storage device configuration can be varied in other embodiments of the invention. For example, the storage device may comprise a hybrid HDD which includes a flash memory in addition to one or more storage disks.

It should also be understood that the particular storage disk configuration and recording mechanism can be varied in other embodiments of the invention. For example, a variety of recording techniques including shingled magnetic recording (SMR), bit-patterned media (BPM), heat-assisted magnetic recording (HAMR) and microwave-assisted magnetic recording (MAMR) can be used in one or more embodiments of the invention. Accordingly, embodiments of the invention are not limited with regard to the particular types of storage media that are used in a given storage device.

FIG. 12 illustrates a processing system 1200 comprising the disk-based storage device 100 coupled to a host processing device 1202, which may be a computer, server, communication device, etc. Although shown as a separate element in this figure, the storage device 100 may be incorporated into the host processing device. Instructions such as read commands and write commands directed to the storage device 100 may originate from the processing device 1202, which may comprise processor and memory elements similar to those previously described in conjunction with FIG. 3.

Multiple storage devices 100-1 through 100-N possibly of various different types may be incorporated into a virtual storage system 1300 as illustrated in FIG. 13. The virtual storage system 1300, also referred to as a storage virtualization system, illustratively comprises a virtual storage controller 1302 coupled to a RAID system 1304, where RAID denotes Redundant Array of Independent storage Devices. The RAID system more specifically comprises N distinct storage devices denoted 100-1, 100-2, . . . 100-N, one or more of which may be HDDs and one or more of which may be solid state drives. Furthermore, one or more of the HDDs of the RAID system are assumed to be configured to include pattern-dependent write functionality as disclosed herein. These and other virtual storage systems comprising HDDs or other storage devices of the type disclosed herein are considered embodiments of the invention. The host processing device 1202 in FIG. 12 may also be an element of a virtual storage system, and may incorporate the virtual storage controller 1302.

Again, it should be emphasized that the above-described embodiments of the invention are intended to be illustrative only. For example, other embodiments can use different types and arrangements of storage media, write heads, control circuitry, preamplifiers, write drivers, driver controllers, pattern-dependent write circuitry, steady state and overshoot segmented DACs, pattern detectors and other storage device elements for implementing the described write signal generation functionality. Also, the particular manner in which write pulse overshoot amplitude is adjusted based on detected write data patterns, as well as the various parameters and waveforms used for the write pulse, may be varied in other embodiments. These and numerous other alternative embodiments within the scope of the following claims will be apparent to those skilled in the art.

What is claimed is:

1. An apparatus comprising:
control circuitry adapted for coupling to a write head of a storage device;
wherein the control circuitry comprises:
a write driver configured to generate a write signal comprising a plurality of write pulses responsive to write data; and
a driver controller associated with the write driver and configured to adjust overshoot amplitudes of respective ones of the write pulses utilizing a segmented digital-to-analog converter;
wherein the driver controller comprises:
a pattern detector configured to detect patterns in the write data; and
pattern-dependent write circuitry comprising the segmented digital-to-analog converter;
wherein the segmented digital-to-analog converter comprises:
a first segment decoder configured to decode a first portion of a base overshoot value to identify a corresponding number of base overshoot segments;
a combiner configured to form a combination of the base overshoot value and a differential overshoot value;
a second segment decoder configured to decode a first portion of the combination of the base overshoot value and the differential overshoot value to identify a corresponding number of enhanced overshoot segments; and
switching circuitry coupled to the first and second segment decoders and configured to select between the number of base overshoot segments and the number of enhanced overshoot segments responsive to detection of a particular pattern by the pattern detector;
wherein the overshoot amplitude for a given one of the write pulses is determined at least in part as a function of the selected one of the number of base overshoot segments and the number of enhanced overshoot segments.

2. The apparatus of claim 1 wherein the combiner comprises:
a shifting circuit configured to shift the differential overshoot value by a predetermined number of bits to obtain a shifted differential overshoot value; and
a summing circuit configured to sum the base overshoot value and the shifted differential overshoot value.

3. The apparatus of claim 1 wherein the switching circuitry comprises a logic circuit configured to perform a logical OR of the number of base overshoot segments and the number of enhanced overshoot segments that effectively selects between the numbers of segments.

4. The apparatus of claim 1 wherein the switching circuitry is configured to select the number of enhanced overshoot segments responsive to detection of a first pattern comprising a first specified run length prior to a current bit of the write data and to select the number of base overshoot segments responsive to detection of a pattern comprising a second specified run length different than the first specified run length prior to the current bit of the write data.

5. The apparatus of claim 4 wherein the first specified run length comprises a run length equal to a single bit period prior to a current bit of the write data and the second specified run length comprises a run length greater than the single bit period prior to the current bit of the write data.

6. The apparatus of claim 1 wherein the pattern detector comprises:
a ramp circuit configured to generate a ramp signal that is reset to an initial value in conjunction with each of a plurality of transitions in the write data; and
a latch circuit coupled to the ramp circuit and configured to generate a pattern detection output signal based at least in part on whether or not the ramp signal reaches a final value after being initiated by one transition and prior to being reset by an immediately following transition.

7. The apparatus of claim 6 wherein the ramp circuit is configured such that the ramp signal ramps from its initial value to its final value in a period of time given approximately by 3T/2 where T denotes a single bit period so as to allow the pattern detector to distinguish between a pattern having a run length equal to T and a pattern having a run length greater than or equal to 2T.

8. The apparatus of claim 6 wherein the driver controller further comprises timer calibration circuitry configured to adjust one or more parameters of the ramp circuit during a calibration mode of operation of the pattern detector.

9. The apparatus of claim 8 wherein the timer calibration circuitry comprises a microcoded timer calibration algorithm that evaluates a timer hit signal generated by a timer calibration latch of the timer calibration circuitry under different control input conditions of the ramp circuit.

10. The apparatus of claim 9 wherein the different control input conditions comprise:
a first set of input conditions in which the timer hit signal is evaluated at respective minimum and maximum values of a ramp control signal with test write data being set to exhibit a first specified run length; and
a second set of input conditions in which the timer hit signal is evaluated at respective minimum and maximum values of the ramp control signal with test write data being set to exhibit a second specified run length different than the first specified run length.

11. The apparatus of claim 1 wherein the overshoot amplitude for a given one of the write pulses is determined as a function of the selected one of the number of base overshoot segments and the number of enhanced overshoot segments together with a binary coded overshoot value corresponding to a selected one of second portions of the respective base overshoot and combined base overshoot and differential overshoot values.

12. The apparatus of claim 1 wherein the driver controller is further configured to adjust steady state amplitudes of respective ones of the write pulses utilizing an additional segmented digital-to-analog converter, wherein the additional segmented digital-to-analog converter comprises:
an additional segment decoder configured to decode a first portion of a steady state value to identify a corresponding number of steady state segments;
wherein a steady state amplitude for the given one of the write pulses is determined at least in part as a function of the number of steady state segments; and
wherein a subset of the steady state segments comprise shared segments that also serve as corresponding ones of the overshoot segments.

13. The apparatus of claim 12 wherein the steady state amplitude for the given one of the write pulses is determined as a function of the number of steady state segments together with a binary coded steady state value corresponding to a second portion of the steady state value.

14. The apparatus of claim 1 wherein the driver controller is at least partially incorporated into the write driver.

15. The apparatus of claim 1 wherein the control circuitry is fabricated in at least one integrated circuit.

16. A method comprising the steps of:
receiving write data to be written to a storage medium of a storage device; and
generating a write signal comprising a plurality of write pulses responsive to the write data;
wherein generating a write signal comprises adjusting overshoot amplitudes of respective ones of the write pulses utilizing a segmented digital-to-analog converter;
wherein adjusting overshoot amplitudes comprises:
detecting patterns in the write data;
decoding a first portion of a base overshoot value to identify a corresponding number of base overshoot segments;
forming a combination of the base overshoot value and a differential overshoot value;
decoding a first portion of the combination of the base overshoot value and the differential overshoot value to identify a corresponding number of enhanced overshoot segments; and
selecting between the number of base overshoot segments and the number of enhanced overshoot segments responsive to detection of a particular pattern;
wherein the overshoot amplitude for a given one of the write pulses is determined at least in part as a function of the selected one of the number of base overshoot segments and the number of enhanced overshoot segments.

17. The method of claim 16 wherein forming the combination comprises:
shifting the differential overshoot value by a predetermined number of bits to obtain a shifted differential overshoot value; and
summing the base overshoot value and the shifted differential overshoot value.

18. A non-transitory computer-readable storage medium having embodied therein executable code for performing the steps of the method of claim 16.

19. A storage device comprising:
a storage medium;
a write head; and
control circuitry coupled to the write head;
the control circuitry comprising:
a write driver configured to generate a write signal comprising a plurality of write pulses responsive to write data; and
a driver controller associated with the write driver and configured to adjust overshoot amplitudes of respective ones of the write pulses utilizing a segmented digital-to-analog converter;
wherein the driver controller comprises:
a pattern detector configured to detect patterns in the write data; and
pattern-dependent write circuitry comprising the segmented digital-to-analog converter;
wherein the segmented digital-to-analog converter comprises:
a first segment decoder configured to decode a first portion of a base overshoot value to identify a corresponding number of base overshoot segments;
a combiner configured to form a combination of the base overshoot value and a differential overshoot value;
a second segment decoder configured to decode a first portion of the combination of the base overshoot value and the differential overshoot value to identify a corresponding number of enhanced overshoot segments; and
switching circuitry coupled to the first and second segment decoders and configured to select between the number of base overshoot segments and the number of enhanced overshoot segments responsive to detection of a particular pattern by the pattern detector;
wherein the overshoot amplitude for a given one of the write pulses is determined at least in part as a function of the selected one of the number of base overshoot segments and the number of enhanced overshoot segments.

20. A virtual storage system comprising the storage device of claim 19.

* * * * *

UNITED STATES PATENT AND TRADEMARK OFFICE
CERTIFICATE OF CORRECTION

| | | |
|---|---|---|
| PATENT NO. | : 8,792,197 B1 | Page 1 of 1 |
| APPLICATION NO. | : 14/074325 | |
| DATED | : July 29, 2014 | |
| INVENTOR(S) | : Wilson et al. | |

It is certified that error appears in the above-identified patent and that said Letters Patent is hereby corrected as shown below:

In the claim

Claim 4, column 19, line 60, before "pattern comprising a second" please insert --second--

Signed and Sealed this
Twenty-first Day of October, 2014

Michelle K. Lee
*Deputy Director of the United States Patent and Trademark Office*